United States Patent
Closse et al.

[15] 3,697,650
[45] Oct. 10, 1972

[54] ANTIBIOTIC SL 3364
[72] Inventors: Annemarie Closse, Binningen; Eugen Härri, Therwil, both of Switzerland
[73] Assignee: Sandoz Ltd. (a/k/a Sandoz AG), Basel, Switzerland
[22] Filed: March 11, 1970
[21] Appl. No.: 18,533

[30] Foreign Application Priority Data

March 18, 1969 Switzerland..............4020/69
March 31, 1969 Switzerland..............4827/69

[52] U.S. Cl....................................424/122, 195/81
[51] Int. Cl. ............................................A61k 21/00
[58] Field of Search ......................424/122; 195/81

[56] References Cited

UNITED STATES PATENTS 3,465,079  9/1969  Sigg et al..................424/122
3,513,232  5/1970  Sigg et al..................424/122

*Primary Examiner*—Jerome D. Goldberg
*Attorney*—Gerald D. Sharkin, Robert S. Honor, Frederick H. Weinfeldt, Richard E. Vila and Walter F. Jewell

[57] ABSTRACT

The invention concerns the new antibiotic SL 3364 having the following characteristics: crystals having the composition of C = 69.6 %, H = 5.7 % and O = 24.2 %, a melting point of 169°–171°C, a specific rotation of $[\alpha]_D^{20} = -388°$ (c = 0.06 in chloroform) and showing characteristic ultraviolet and infrared spectrums.

The antibiotic possesses a fungistatic effect and furthermore exhibits a cytostatic effect on mostocytoma p 815 in vitro.

3 Claims, 2 Drawing Figures

ANTIBIOTIC SL 3364

The present invention relates to a new antibiotic, hereinafter referred to as SL 3364.

Figure 1:
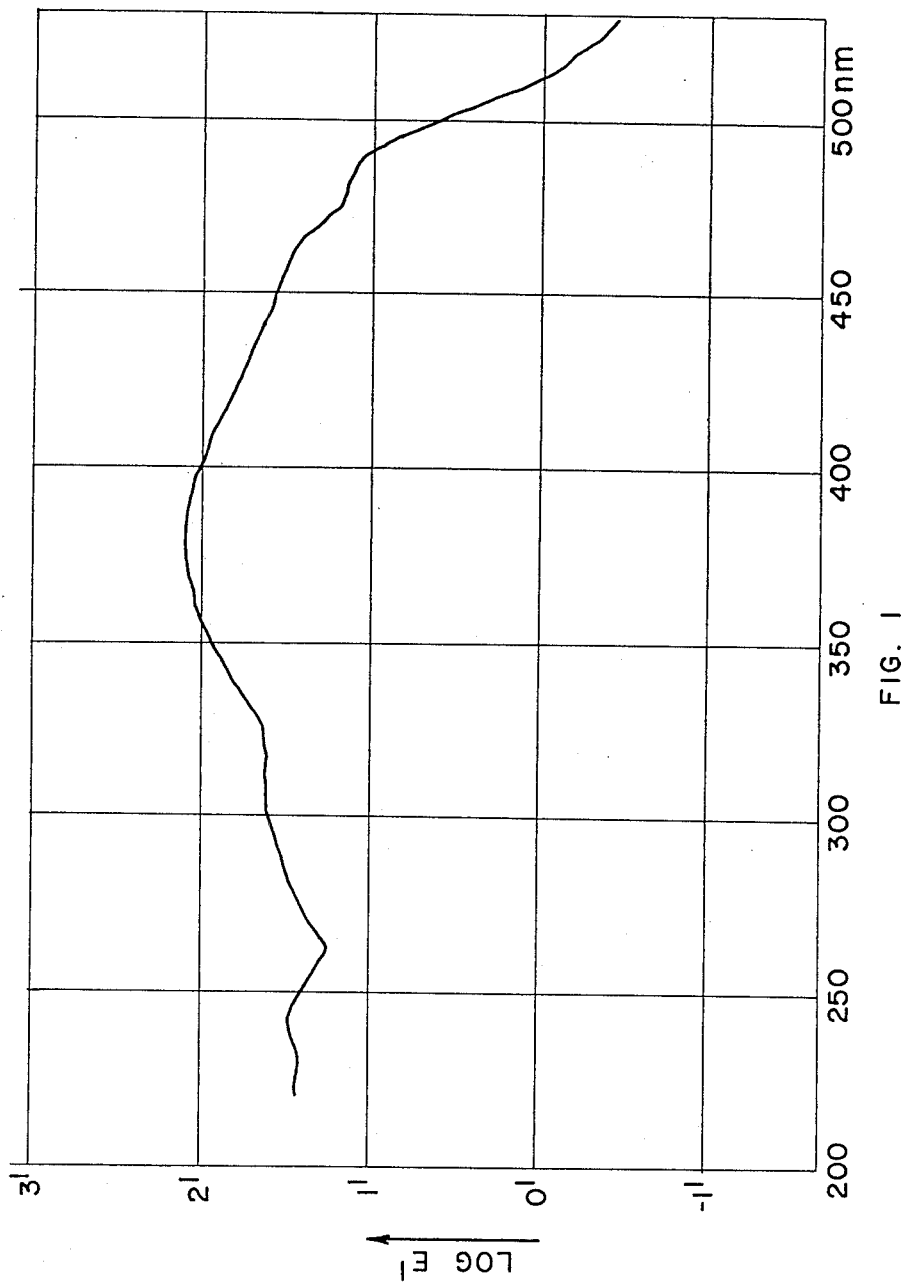
Figure 2:
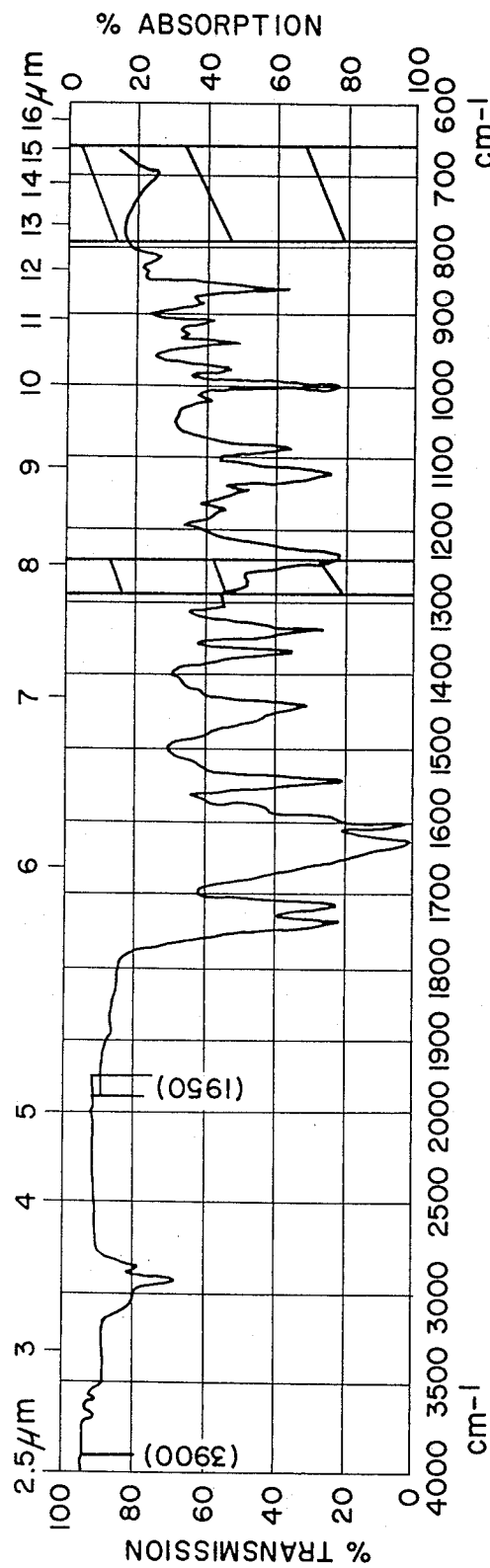

The present invention provides the new antibiotic SL 3364 having the following characteristics: crystals having the composition of C = 69.6 %, H = 5.7 % and O = 24.2 %, a melting point of 169°–171°C, a specific rotation of $[\alpha]_D^{20} = -388°$ (c = 0.06 in chloroform) and showing the ultraviolet spectrum (in methylene chloride) and the infrared spectrum (in methylene chloride) of FIGS. 1 and 2, respectively.

According to another aspect of the present invention a process for the production of the new antibiotic SL 3364 is characterized in that the strain NRRL 3489 of the fungus species Sepedonium chrysospermum is cultivated in contact with a nutrient medium, and the resulting antibiotic is isolated from the fermentation liquor and the mycelium and purified by methods known per se.

The new strain NRRL 3489 of Sepedonium chrysospermum employed in the process was isolated from a soil sample found in England, and a specimen of said strain has been deposited with the United States Department of Agriculture (Northern Utilization Research and Development Division), Peoria, Ill., U.S.A., under the reference NRRL 3489.

The new strain NRRL 3489 of the fungus species Sepedonium chrysospermum grows on a glucose/malt extract/yeast extract/peptone agar at 18° to 27°C and forms a felted, white or beige aerial mycelium. The under side of the colony shows a red-brown coloration of the substrate. Older colonies develop a light, clear exudation. The aerial hyphae are irregularly branched and septated, have a diameter of 3.0 to 5.5μ, are pale orange-colored and spread as a thin layer over the surface of the agar. The conidiophores do not differ pronouncedly from the vegetative hyphae; they are simple or divided, hyaline, usually septated, thickened under the septum and have a diameter of 4.0 to 4.5μ. Two types of spores are formed:
  i. thin-walled, ellipsoidal or pear-shaped conidia, loosely grouped at the end of long ramifications, 9.0 to 11.0 × 4.5 to 6.0μ, hyaline,
  ii. thick-walled, chlamydospore-like conidia, spherical, clearly warty, with large oil drops, diameter 11.5 to 16.0μ, light cadmium-colored, singly on side ramifications.

Morphologically and physiologically the new strain NRRL 3489 of the fungus species Sepedonium chrysospermum conforms to the descriptions of the fungus species Sepedonium chrysospermum given in J.C.Gilman, A manual of Soil Fungi, page 301, The Iowa State University Press, Ames, Iowa, U.S.A. (1957) and in G.L.Barron, The Genera of Hyphomycetes from Soil, pages 278–279, The Williams and Wilkins Co., Baltimore, U.S.A. (1968).

The new strain of the fungus species Sepedonium chrysospermum may be cultivated on various nutrient media containing the usual nutrients to provide the new antibiotic. For example nutrients usually employed for carbon-heterotrophic organisms may be used. For example glucose, starch, dextrin, lactose or cane sugar may be used as the carbon source, organic and inorganic nitrogen-containing compounds, such as tryptone, yeast or meat extracts, ammonium chloride, ammonium nitrate or amino acids may be used as the nitrogen source, as well as the usual mineral salts and trace elements.

One method of producing the antibiotic SL 3364 comprises inoculating a liquid nutrient medium with a suspension of mycelium of the new strain of Sepedonium chrysospermum and incubating the culture at 18°C. The cultivation may be effected under aerobic conditions by static surface culture fermentation or by submerged culture fermentation with shaking, or in fermenters provided with devices for introducing air or oxygen and agitators. As soon as the maximum amount of antibiotic has been produced, after about 8 days, the culture solution is filtered and the antibiotic is obtained from the mycelium-free culture solution and the previously mechanically destroyed mycelium in a manner known per se, by extraction or adsorption.

One convenient method of isolating the antibiotic of the present invention comprises the mechanical destruction of the mycelium after the separation thereof from the culture liquid, the extraction of the antibiotic with chloroform from an aqueous solution containing the antibiotic obtained from the mycelium, and the extraction of the antibiotic from the mycelium-free culture solution with ethyl acetate, although other organic solvents, e.g. benzene, chloroform, butyl acetate, methylene chloride or butanol, may likewise be used. The new antibiotic may be isolated from the extracts by chromatography.

The new antibiotic SL 3364 may be characterized as follows: Ultraviolet spectrum (methylene chloride):

$\lambda$ max = 243 nm (log $\epsilon'$ = 1.48),
308.5 nm (log $\epsilon'$ = 161),
380 nm (log $\epsilon'$ = 2.10) (FIG. 1).

Infrared spectrum (methylene chloride):
inter alia bands at 1,740, 1,717, 1,305, 1,603 cm$^{-1}$ (FIG. 2).

The new antibiotic is characterized by interesting pharmacological properties and is therefore indicated for use as a medicament.

The new antibiotic is a useful fungistatic as indicated by a fungistatic effect against various organisms causing fungus infections. It has a particularly good activity in vitro against:

Trichophyton mentagrophytes (lowest inhibiting concentration 10 δ/ml)
Trichophyton tonsurans (lowest inhibiting concentration 10 δ/ml)
Trichophyton rubrum (lowest inhibiting concentration 10 δ/ml)
Epidermophyton floccosum (lowest inhibiting concentration 3 δ/ml)
Microsporum canis (lowest inhibiting concentration 10 δ/ml)
Microsporum audouinii (lowest inhibiting concentration 3 δ/ml).

The new antibiotic has a cytostatic effect in vitro on a cell strain derived from a mouse tumor (mastocytoma P–815). Thus, the new antibiotic, at a concentration of 1.5 mg/liter, exhibits a 50 percent inhibition of mastocytoma P–815 increase in vitro.

In general, dependent on the nature of the treatment desired, a suitable single dose for larger mammals is between 50 and 1,000 mg, preferably administered daily. A suitable preparation for oral administration contains between 50 and 1,000 mg of the active agent, mixed with a liquid or solid pharmaceutically acceptable carrier. Powders, sprays, ointments or tinctures, containing 0.1 to 2 percent of the active agent, may be employed for topical application in the treatment of fungus infections occurring in warm-blooded animals.

In the following example, which illustrates the process without in any way limiting the scope of the invention, all temperatures are indicated in degrees Centigrade. The melting points were determined on a Kofler block.

EXAMPLE 10 liters of a nutrient solution (of which each liter contains
- 40 g of Cerelose
- 5 g of tryptone
- 3 g of NaNO$_3$
- 1 g of K$_2$HPO$_4$
- 500 mg of KCl
- 500 mg of MgSO$_4 \cdot$ 7 H$_2$O
- 10 mg of FeSO$_4 \cdot$ 7 H$_2$O and demineralized water to make up 1 liter) are inoculated in a fermenter with a suspension of mycelium of the strain NRRL 3489 of Sepedonium chrysospermum, and incubation is effected at 18° for 8 days while aerating (1 liter of air per minute per liter of nutrient solution) and stirring (150 revolutions per minute). The culture liquid is filtered over a Celite porous layer and the antibiotic is extracted from the filtrate with ethyl acetate. The mycelium is crushed in an Ultra-Turrax apparatus with methanol, filtered off and washed with methanol/water (9:1). The methanol is distilled off and the aqueous phase is extracted with chloroform. The resulting crude extracts are chromatographed on silica gel Merck (0.05–0.2 mm) which has been washed with hydrochloric acid and dried. The new antibiotic SL 3364 is eluted with chloroform/methanol (99:1) and recrystallized several times from methanol. The new antibiotic is obtained in the form of orange-colored crystals having a melting point of 169°–171°.

The suspension of mycelium employed for inoculation is produced in two stages. A culture of the originally isolated strain is first cultivated at 27° for 8 days on an agar medium having the following composition:
- 20 g of Cerelose
- 20 g of filamentous agar
- 2 g of malt extract
- 2 g of yeast extract
- 2 g of peptone
- 2 g of KH$_2$PO$_4$
- 2 g of MgSO$_4 \cdot$ 7 H$_2$O and demineralized water to make up 1 liter.

In the second stage this culture is incubated at 27° for 7 days, in the fermentation medium indicated above while shaking, and the mycelium suspension produced therefrom is subsequently used as described in the example.

What is claimed is:

1. The antibiotic SL 3364 having the composition C=69.6%, H5.7% and O=24.2%, a melting point of 169°–171°C, a specific rotation of $[\alpha]_D^{20} = -388°$ (c=0.06 in chloroform) and having infrared spectrum bands (in methylene chloride) at 1,740, 1,717, 1,630 and 1,603 cm$^{-1}$ and ultraviolet spectrum maxima (in methylene chloride) at 243 nm (log $\epsilon'$=1.48), 305.5 (log $\epsilon'$=161) and 380 nm (log $\epsilon'$=2.10).

2. A pharmaceutical composition comprising 50 to 1,000 mg of the antibiotic SL 3364 as defined in claim 1 in association with a pharmaceutically acceptable carrier.

3. A process for the production of the antibiotic SL 3364 comprising cultivating Sepedonium chrysospermum NRRL 3489 in contact with a nutrient medium until a sufficient amount of antibiotic SL 3364 activity has been produced, and isolating the resulting antibiotic from the fermentation liquor and mycelium.

* * * * *